United States Patent Office 2,773,765 Patented Dec. 11, 1956

2,773,765

LIGHT SENSITIVE MATERIAL FOR PHOTO-MECHANICAL REPRODUCTION

Oskar Süs and Maximilian Paul Schmidt, Wiesbaden-Biebrich, and Martin Glos, Wiesbaden, Germany, assignors, by mesne assignments, to Azoplate Corporation, Summit, N. J., a corporation of New Jersey No Drawing. Application August 11, 1953, Serial No. 373,681

Claims priority, application Germany August 16, 1952

19 Claims. (Cl. 96—33)

The present invention relates to the field of photomechanical reproduction. More particularly it relates to light-sensitive material for use in photomechanical reproduction, wherein water insoluble esters or amides of nitro-naphthalene-sulfonic acids are used as light-sensitive substances.

The known kinds of light-sensitive material which are used in photomechanical reproduction, as for example the fabrication of printing plates and stencils by the photomechanical method, usually employ colloid layer containing substances which are capable of hardening under the influence of light-rays. It has recently been proposed to use a light-sensitive material free from such a colloid coating in printing plates. Said new light-sensitive material consists of a support, which may be a metal foil or a thin metal plate, or alternatively a plastic foil or paper foil; and of a layer which is coated onto the support, and consists of the light-sensitive substance itself, wherein either the light-sensitive substance or the products formed thereof under the influence of light, or both, are oleophilic, i. e. they show affinity to greasy ink.

One object of the present invention is to provide a light-sensitive material for photomechanical reproduction printing plates, comprising a support and a light-sensitive layer, wherein the light-sensitive layer consists essentially of water insoluble esters or amides of nitro-naphthalene-sulfo-acids. Another object is to provide a material for use in printing plates, having a high degree of light sensitivity. A still further object is to provide a light-sensitive material requiring a short exposure time for decomposition.

We have found that by using the above mentioned nitro-naphthalene-sulfo-acid-esters or nitro-naphthalene-sulfonamides outstanding advantages are obtained by employing compounds containing the nitro-group and the sulfo-acid-group in peri-position to the naphthalene nucleus or in the 1,5 or ana position to each other. The nitro-naphthalene-sulfo-acid-esters and amides may be substituted in the naphthalene nucleus as well as in the phenol or basic component of the ester or amide group, for instance, by alkyl-, alkoxy-, nitro-, hydroxyl- or carboxyl groups. Furthermore, it has been found that the presence of an additional nitro-group linked to the naphthalene-nucleus results in a higher degree of light-sensitivity. Also, the printing plates are better able to withstand the strain of the printing procedure.

Amides and esters which contain several residues of a nitro-naphthalene-sulfo-acid have been found to be highly suitable because they usually yield layers of a higher degree of light-sensitivity than the compounds with only one nitro-napthalene-sulfonyl residue, and they yield images which after development adhere very firmly to the foil. Also, compounds formed by causing the nitro-naphthalene-sulfo-chlorides to react with compounds having a hydrogen atom linked to a nitrogen atom which is a ring member of a hetero nucleus, have been found to be well suited.

On transferring the image to be multiplied onto the light-sensitive material by actinic light according to this invention, products are formed in the areas hit by light which show a higher solubility in dilute alkaline solutions than the non-light struck areas of nitro-naphthalene-sulfo-acid-esters or nitro-naphthalene-sulfonamides. On treating the layer, which was exposed under the pattern to be reproduced, with dilute alkaline solutions, the products formed by the actinic light will be dissolved while the light-sensitive substance which has not been hit by light and therefore is still undecomposed, remains on the support to form a positive image, which, if desired, may be etched in the normal way. The nitro-naphthalene-sulfo-acid-esters and nitro-napthalene-sulfon-amides usable according to this invention are oleophilic and, therefore, are receptive to greasy ink, so that the foils after exposure and development with alkaline solutions, and, preferably, after treatment with dilute acids, are well suited for use as printing plates.

To produce the light-sensitive material, the nitro-naphthalene-sulfo-acid-esters or nitro-naphthalene-sulfonamides are applied onto the support as solutions in a suitable organic solvent or mixture of solvents, preferably in a solvent boiling between 70° and 130° C., advantageously as in solutions of between 1% and 3%. Metals, such as aluminum, or zinc, are preferred as support materials. After the vaporization of the solvent, the light-sensitive substance will remain as a thin, water-repellent coating on the metal surface. In order to obtain a complete evaporation of the solvent and a firm anchoring of the coating to the base, it is necessary to submit the coated foils to an effective redrying, suitably between 80° C. and 100° C. The light-sensitive material made in this manner exhibits excellent storage stability.

The transfer of the pattern onto the light-sensitive material is accomplished in the usual manner. The exposure time of the layer may vary within considerably broad limits and depends on the quantity of light-sensitive substance present in the layer and on the kind of the light-sensitive compound used. Before the light-sensitive materials are exposed to light under a pattern, their sensitivity may be found with the aid of a photometric wedge. Due to the fact that the areas hit by the light become slightly brown or grey colored, the image becomes dimly visible after exposure.

The development of the exposed foils is completed by wiping their image side over with a cotton swab soaked with dilute aqueous alkaline solutions, suitably in concentrations of 1% to 5%. The exposed foils may also be bathed in the developer. The kind of alkali to be used depends on the compound present in the light-sensitive layer. The nitro-sulfon-amides, in general, give images which are easier to develop than the nitro-sulfo-acid-esters. For the former, the tertiary salts of the phosphoric-acid have proved to be the best developing substance, while for the latter the application of highly diluted sodium-hydroxide-lye with a content of about 0.5% to 1% is preferable or even necessary. For a complete clearing of the background of the image, we have found that the exposed foils should be subjected to an aftertreatment with a dilute acid, preferably phosphoric acid, by wiping over the side of the foil covered by the image. The dilute acid may contain admixtures such as arabic gum or dextrine, for example.

Since, in practice, it is desirable to be able to observe the formation of the image during its development, it is advantageous to add some dyestuff to the light-sensitive compounds. Well suited for this purpose are, for instance, dyes belonging to the triphenyl-methane-dyes, such as eosine or methylviolet. When the exposed material is treated with the alkaline solution, these dyes adhere firmly to the coating within the areas not hit by light, while hey are removed together with the light-reaction products from the areas struck by light.

It may be advantageous to add small quantities—i. e. about 10% to 40% of the quantity of light-sensitive substance—of alkali-soluble resins, especially of the phenol formaldehyde resin series, to the solutions of the esters or amides of nitro-naphthalene-sulfonic acids which serve for the production of the light-sensitive layer. These alkali-soluble resins prevent the light-sensitive layer substance from crystallizing and promote the formation of a smooth film, equally distributed on the surface of the support. In addition, the nitro-naphthalene-sulfonic-acid-esters and -amides to be used in accordance with the invention are usable together with water-insoluble sulfonic acid esters or sulfonamides of ortho-diazo-phenols, especially those of the benzene and naphthalene series. Layers produced with these mixtures after exhibit an increased light-sensitivity and are capable of yielding images for use as printing forms which adhere very firmly to the base material.

The compounds to be used according to the present invention are produced by causing the chlorides of the nitro-naphthalene-sulfonic-acids to react by known methods with amino or hydroxy compounds or with amino-hydroxy compounds, especially of the aromatic or heterocyclic kind. Compounds which are obtained by esterifying or amidating the nitro-naphthalene-sulfonic acids with aromatic or heterocyclic hydroxyl compounds or amines are specially well suited for use in printing foils.

The following formulae, which are referred to in the subsequent examples, are inserted in order to illustrate the present invention:

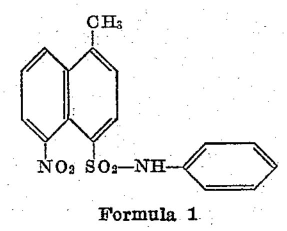

Formula 1

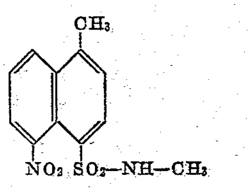

Formula 2

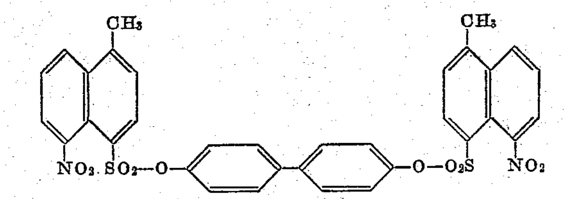

Formula 3

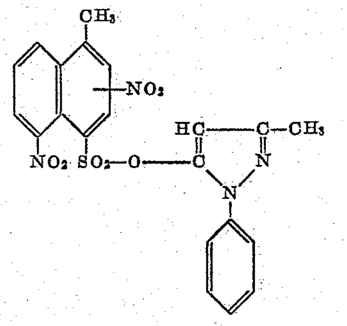

Formula 4

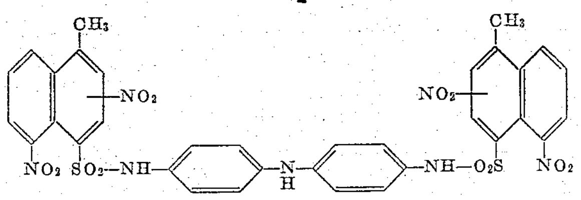

Formula 5

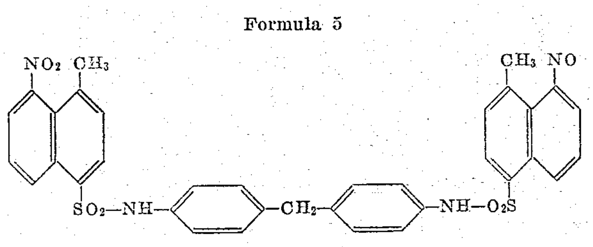

Formula 6

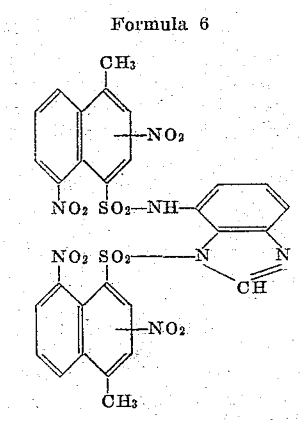

Formula 7

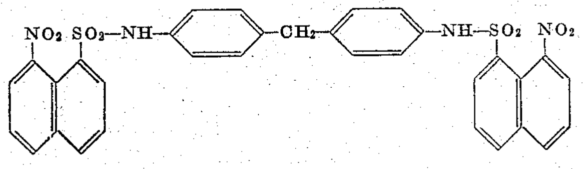

Formula 8

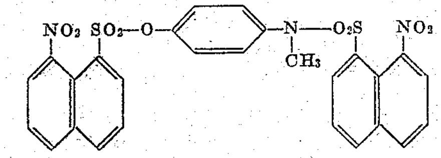

Formula 9

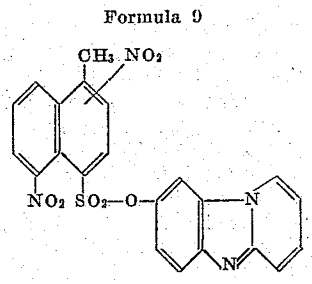

Formula 10

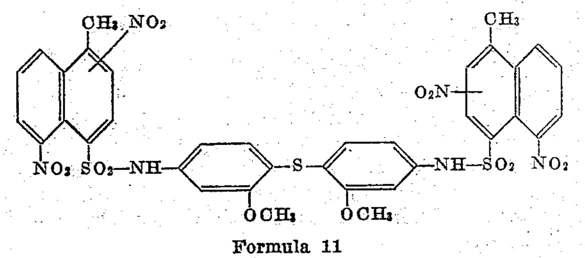

Formula 11

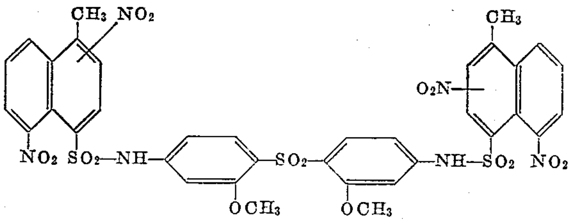

Formula 12

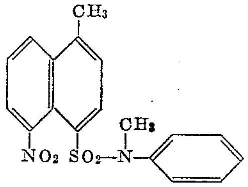

Formula 13

The following examples are inserted in order to illustrate the present invention, and should not be construed as being limitative of the scope thereof. Where not otherwise stated, the parts are by weight.

*Examples*

1. A 1% solution of 1-methyl-5-nitro-naphthalene-4-sulfanilide (corresponding to Formula 1) in a mixture consisting of equal parts by volume of glycolmonomethyl ether and dimethyl-formamide is whirlcoated onto a mechanically roughened aluminum foil with the aid of a plate whirler. The coated foil is briefly dried with the aid of hot air and the drying is then continued for about 5 minutes at 90° C. Subsequently the sensitized foil is exposed under a transparent film master to the light of an arc lamp of 18 amp. for 15 minutes, at a distance of about 70 cm. In order to develop the image thus produced (a positive image is obtained from a positive master), the exposed foil is swabbed with a 5% trisodium phosphate solution. To make the developed foil ready for printing, its image carrying side is briefly wiped over with a 1% phosphoric acid solution before it is inked with greasy ink. Thereafter it may be used as a printing plate.

The 1-methyl-5-nitro-naphthalene-4-sulfanilide (corresponding to Formula 1) is produced according to the directions given by R. E. Steiger in "Helvetica Chimica Acta," vol. XIII, p. 184 (1930).

When a 1% solution of 1-methyl-5-nitronaphthalene-4-sulfonic-N-methyl-anilide (according to Formula 13) is used for coating the aluminum foil, 1 n-caustic soda solution is necessary to develop the picture thus produced. After the developed layer has been wiped over with a 1% solution of phosphoric acid and then inked with greasy ink, the image (a positive image is obtained from a positive master) is clearly visible.

1-methyl-5-nitro-naphthalene-4 - sulfonic - N - methylanilide is prepared according to the directions given by R. E. Steiger in "Helvetica Chimica Acta," vol. XVII, page 1151 (1934).

The same good results are obtained with the 1-methyl-5 - nitro-naphthalene-4-sulfo - monomethyl - amide (conforming to the Formula 2). When using the same light-source as described above (same amperage and distance), the time of exposure of the light-sensitive foil produced with this nitro compound is 5 to 6 minutes.

The image is developed by swabbing with a 1% trisodium phosphate solution.

The 1-methyl-5-nitro-naphthalene-4-sulfo-monomethylamide corresponding to Formula 2 is produced according to the statements of R. E. Steiger in "Helvetica Chimica Acta," vol. XVII, page 1147 (1934).

2. A glycol-monomethyl ether solution containing 1% of p,p'-bis-(1-methyl - 5 - nitro-naphthalene - 4 - sulfonic acid)-diphenyl ester (corresponding to formula 3) and 0.2% of a formaldehyde phenol novolak, which is sold by the firm "Chemische Werke Albert" at Wiesbaden-Biebrich, Germany, under the name of "Alnovol" (registered trademark in Germany) is whirlcoated onto a mechanically roughened aluminum foil with the aid of a plate whirler. The coated foil is briefly dried with the aid of hot air and the drying is then continued for about 15 minutes at 90° C. Thereafter, the sensitized foil is exposed under a transparent positive film master to the light of an arc lamp, as described in Example 1. The exposed foil is at first inked with greasy ink and then wiped over successively with a 1% and a 5% solution of trisodium phosphate, and with 1 n-caustic soda. After development, the foil is rinsed with water, wiped over with a 1% solution of phosphoric acid, and then once more inked with greasy ink. In this manner, a positive printing plate is obtained.

The compound corresponding to Formula 3 is produced in the following manner:

To a solution of 1 mol of 1-methyl-5-nitro-naphthalene-4-sulfo-chloride (obtained according to the directions given by R. E. Steiger in "Helvetica Chimica Acta," vol. XIII, page 182, 1930) in acetone, a solution of ½ mol p,p'-dihydroxy-diphenyl in 1 mol 1 n-caustic soda and acetone is added slowly drop by drop while stirring the mixture constantly. Thereafter the stirring is continued for 30 minutes and then the solvent is removed under reduced pressure. The residue is recrystallized from alcohol, after addition of animal charcoal. The ester thus obtained melts at 224° to 225° C.

Similar results are obtained with 1-methyl-5,x-dinitro-naphthalene-4-sulfonic acid-(1'-phenyl-3'-methyl-5'-pyrazole)-ester corresponding to Formula 4, even without the addition of formaldehyde phenol novolak. A foil light-sensitized with this ester, when exposed at a distance from the lamp and at an amperage which are equal to those described in Example 1 requires three minutes for exposure. The development of the image produced is effected by swabbing the exposed foil with a 1% solution of trisodium phosphate. Before inking the developed foil with greasy ink to make it ready for producing reproductions, it is briefly wiped over with a 1% phosphoric acid. Thus, a positive printing plate is obtained from a positive master.

The pyrazole ester corresponding to Formula 4 is produced in the following manner:

While agitating the reacting mixture and keeping it at a temperature of 0° C., 1-methyl-naphthalene-4-sulfochloride (compare R. E. Steiger, "Helvetica Chimica Acta," vol. XIII, p. 179 (1930) is added to the threefold quantity by weight of nitric acid ($D=1.475$). The reaction mixture is agitated for another hour while its temperature rises to 15° C., and then the mixture is poured onto ice. The separated substance is sucked off, washed with water and ground with ether in a mortar until the product, which in the beginning is somewhat doughy, is completely disintegrated. The reaction product is filtered off by suction and ground first with absolute alcohol and then with dry ether. The crude 1-methyl-5,x-dinitro-naphthalene-4-sulfo-chloride thus obtained is recrystallized from benzene. After a further recrystallization from acetone almost colorless crystals are formed with melt at 200° C.

While agitating and keeping the temperature of the reaction mixture at 40° to 45° C., a solution of 1.8 g. 1-phenyl-3-methyl-pyrazolone-(5)—(tautomeric with 1-phenyl-3-methyl-5-hydroxypyrazole)—in 11 ccm. 1-n-caustic soda and 40 ccm. acetone is dropped into a solution of 3.3 g. of 1-methyl-5,x-dinitro-naphthalene-4-sulfochloride in 50 ccm. of acetone, and agitation of the reaction mixture is continued for 30 minutes. The solvent is removed by application of vacuum, and the residue is ground with hydrochloric acid (1:1) in excessive quantities. Then the solvent is sucked off and the residue is washed with water. After recrystallization the compound, when heated, begins to decompose at 100° C.

If the aluminum foil is coated with a 1% solution in glycol monomethyl ether of 1-methyl-5,X-dinitro-naphthalene-4-sulfonic acid—[6'hydroxy-pyridino-(1'',2'',1',-2')-benzimidazole]—ester (corresponding to Formula 10), it is sufficient to expose the dried layer for two to three minutes to light under a pattern. In order to develop the image thus produced, the layer side of the foil is wiped over with a cotton swab soaked in a 5% sodium hydroxide solution. After a short swabbing with a 1% solution of phosphoric acid, the foil is inked with greasy ink, whereupon a positive image is obtained from a positive pattern.

The sulfonic acid ester corresponding to Formula 10 is prepared by heating for two hours and while using a reflux condenser a solution of 3 g. of 1-methyl-5,X-dinitro-naphthalene-4-sulfochloride, 0.5 g. of caustic soda and 1.8 g. of 6-hydroxy-pyridino-(1',2',1,2)-benzimidazole (see L. Schmid and H. Czerny "Monatshefte für Chemie," vol. 83, page 31, 1952) in 70 cc. of dioxane. After the solvent has been removed from the reaction mixture under reduced pressure, the residue is treated with surplus hydrochloric acid, sucked off and washed with water. The condensation product is then dissolved in glycol monomethyl ether, treated with animal charcoal and precipitated from the filtered solution by adding water. The resultant is a yellow-brown powder, which on being heated up to 190° C. darkens and is charred.

3. A solution of glycol monomethyl ether containing 1% of p,p'-bis-(1-methyl-5,x-dinitro-naphthalene-4-sulfonamide)-diphenylamine, corresponding to Formula 5, is whirlcoated onto a mechanically roughened aluminum foil by means of a plate whirler. As described in Example 1, the coated foil is dried, exposed under a transparent film master to the light of an arc lamp of 18 amp. at a distance of 70 cm. for 1½ to 2 minutes, and swabbed with 0.5% caustic soda in order to develop the produced image. A somewhat slower, but more preserving development of the image is effected by swabbing with a 10% solution of trisodium phosphate. To make the developed foil ready for reproduction, it is briefly wiped over with 1% phosphoric acid before the greasy ink is applied. In this way, a positive printing plate is obtained from a positive master.

The compound corresponding to Formula 5 is prepared in the following manner:

While refluxing, 3 g. of 1-methyl-5,x-dinitro-naphthalene-4-sulfochloride (see Example 2) and 1 g. of p,p'-diamino-diphenylamine are heated together for 1½ hours with the addition of 0.5 g. of caustic soda in 50 cc. of dioxane. After the reaction mixture is cooled, the solvent is evaporated by vacuum. The residue is ground with 50 cc. of 2 n-hydrochloric acid. The reaction product is sucked off and washed with water. The raw product is dissolved in glycol monomethyl ether, treated with animal charcoal and re-precipitated as a light gray powder by addition of water to the solution. Repeating this purification, a light-brown substance is obtained which on heating decomposes above 145° C.

If a 1% solution of p,p'-bis-(1-methyl-5,X-dinitro-naphthalene-4-sulfonamido) - 2,2'-dimethoxy-diphenylsulfide (corresponding to Formula 11) in glycol monomethyl ether is used for coating the aluminum foil, exposure of the dried foil for two or three minutes under a pattern is sufficient. The image thus produced (a positive image from a positive master) is developed by wiping over the exposed layer with a cotton swab soaked in a 5–10% solution of trisodium phosphate. The foil is then swabbed over with a 1% solution of phosphoric acid and inked with greasy ink. Foils thus sensitized exhibit an excellent storability in the unexposed state.

In order to prepare the compound corresponding to Formula 11, 3 g. of 1-methyl-5,X-dinitro-naphthalene-4-sulfo-chloride are dissolved in 70 cc. of dioxane. Then 0.5 g. of caustic soda and 1.4 g. of 4,4'-diamino-2,2'-dimethoxy-diphenylsulfide are added and the mixture is heated with reflux for two hours. After the solvent has been removed from the reaction mixture under reduced pressure, the residue is treated with excess hydrochloric acid, sucked off and washed with water. The condensation product is then dissolved in glycol monomethyl ether, treated with animal charcoal, and precipitated from the filtered solution by adding water. The new compound corresponding to Formula 11 is a gray powder which decomposes on being heated up to 165° C.

Equivalent results are obtained when p,p'-bis-(1-methyl-5,x - dinitro - naphthalene - 4 - sulfonamide) - 2,2' - dimethoxy-diphenyl sulfone (corresponding to Formula 12) is used as the light sensitive substance. The image which is obtained as previously described is developed by wiping the exposed foil with a 15% solution of trisodium phosphate. After being lightly swabbed with a 1% solution of phosphoric acid, the foil is then inked with greasy ink. Thus a positive image is obtained from a positive pattern. The state of the exposure can be easily observed by the increasing reddish brown coloring of the sensitized foil.

The compound corresponding to Formula 12 is prepared analogously to the compound corresponding to Formula 11. Instead of 1.4 g. of 4,4'-diamino-2,2'-dimethoxy-diphenyl sulfide as used for preparing the compound of Formula 11, 1.5 g. of 4,4'-diamino-2,2'-dimethoxy-diphenyl sulfone are used in this case. The compound corresponding to Formula 12 is obtained as a yellow-brown powder which decomposes on being heated up to 185° C.

Similar results are obtained with p,p'-bis-(1-methyl-8-nitro - naphthalene - 4 - sulfonamido) - diphenylmethane corresponding to Formula 6. Given the same amperage and distance of lamp as in Example 1, the foil, light-sensitized with this compound requires an exposure of 4 minutes. The image is developed by swabbing with a 5% solution of trisodium phosphate.

The compound corresponding to Formula 6 is prepared in the following manner:

While refluxing, 1-methyl-8-nitro-naphthalene-4-sulfochloride (compare R. E. Steiger, "Helvetica Chimica Acta," vol. XIII, page 183, 1930) is heated for 1½ hours together with ½ equivalent of p,p'-diamino-diphenylmethane and 1 equivalent of caustic soda in a dioxane solution. After cooling the reaction mixture, the solvent is evaporated under reduced pressure. The residue is ground with an excessive amount of 2 n hydrochloric acid, sucked off and washed with water. Then it is dissolved in glycol-mono-methyl ether, treated with animal charcoal and precipitated by addition of water to the solution. The residue is a light-brown powder decomposing at 160° C. when heated.

4. A 1% solution of 1,7-bis-(1-methyl-5,x-dinitro-naphthalene-4-benzimidazole (corresponding to Formula 7) in glycol monomethyl ether is whirlcoated by means of a plate whirler onto a mechanically roughened aluminum foil. The coated foil is first briefly dried with hot air and the drying is then continued for 5 minutes at 90° C. Subsequently, the sensitized foil is exposed to the light of an arc lamp under a transparent film master as described in Example 1 for three minutes. The image produced is developed by swabbing the foil with a 0.5% solution of trisodium phosphate. After wiping over with a 1% aqueous phosphoric acid, the foil is inked with greasy ink. Thus a positive printing plate is obtained from a positive master.

The compound corresponding to Formula 7 is produced in the following manner:

While refluxing, 0.65 g. of 7-amino-benzimidazole are heated for 1½ hours together with 3 g. of 1-methyl-5,x-dinitro-naphthalene-4-sulfochloride and 0.5 g. caustic soda in 65 cc. of dioxane. After cooling down the reaction mixture, the dioxane is evaporated at reduced pressure, the residue is ground with concentrated hydrochloric acid and then sucked off. The product is washed with water, dissolved in glycol-monomethyl ether, treated with animal charcoal and, after filtration, precipitated from the solution as a light-brown powder by addition of water. When heated, decomposition begins at 250° C.

5. A 1.5% solution of p,p'-bis-(1,8-nitro-naphthalene-sulfon-amido)-diphenylmethane (corresponding to Formula 8) in glycol-monomethyl ether is coated in the usual manner as a thin layer onto a mechanically roughened aluminum foil. The well-dried layer is exposed for three minutes under a diapositive film to the light of an 18 ampere lamp, at 60 cm. distance. Subsequently it is wiped over with a cotton swab soaked in a 3% solution of trisodium phosphate whereby the nitro compound is removed from the areas hit by light, and a weak positive image is obtained on a bright background. After wiping over with a 1% phosphoric acid solution and then rinsing with water, the image can be used in the usual way for printing with greasy ink.

Red dyed images are obtained if 0.15% of eosine ethyl-ester is added to the solution of p,p'-bis-(1,8-nitro-naphthalene - sulfon - amido) - diphenyl - methane and the light-sensitized layer thus obtained is exposed under a master and developed. Such plates are particularly suitable for use in making sign-boards or stencils.

To prepare the light-sensitive compound corresponding to Formula 8, a solution of 12 g. of 1,8-nitro-naphthalene-sulfochloride in 60 cc. of dioxane is added to a solution of 4 g. of 4,4'-diamino-diphenyl methane in 40 cc. of dioxane, and adding 48 cc. of a 10% soda solution while supplying a small amount of heat. Subsequently, the reaction mixture is heated for approximately 1 hour to 45° to 50° C. and then poured into about 500 cc. of dilute hydrochloric acid. The condensation product separates out as a reddish colored substance and is filtered off by suction, washed with water and dried. It is purified by dissolving it in acetone and reprecipitating it from the solution by addition of water. When dissolving it in benzene and adding gasoline to this solution, the product can be obtained as an almost white material. The p,p' - bis - (1,8 - nitro - naphthalene - sulfonamido) - diphenyl-methane is readily soluble in dioxane and monomethyl ether, as well as in the previously mentioned solvents. The substance melts on heating at about 170° C. with decomposition after the aforementioned sintering step.

6. A 1% solution of O-N-bis-(1,8-nitro-naphthalene-sulfonyl) - p - N-methylaminophenol, (corresponding to Formula 9) in a mixture consisting of 66 parts by weight of dimethylformamide and 34 parts by weight of glycol-monomethyl ether is coated as a thin layer, as described in Example 4, onto an aluminum foil which has been roughened by means of a wire brush, and the foil is used in the way given in Example 4, except that the light-sensitive layer is exposed for 8 minutes under the same master and that it is developed with a 5% solution of trisodium phosphate.

To prepare the nitro compound corresponding to Formula 9, a solution of 5.4 g. of 1,8-nitro-naphthalene-sulfochloride is added to a solution of 1.2 g. of N-methyl-p-amino-phenol (metol) in 20 cc. of water and 10 cc. of dioxane, and, while heating the mixture to 40° C., 25 cc. of a 10% soda solution are added slowly. An oil segregates which congeals within a short time. After heating the reaction mixture to 50° C., water is added in order to precipitate the condensation product as completely as possible. Subsequently, the condensation product is sucked off, washed with water and dried. The product is slightly soluble in the common solvents, whereas it is easily soluble in pyridine and dimethylformamide. Double recrystallization from dimethylformamide with addition of water yields the O-N-bis-(1,8-nitro-naphthalene-sulfonyl)-p-N-methyl-amino-phenol in pure form as an almost white powder that melts at 250° C.

7. A smooth zinc plate cleaned with water and pumice powder is coated by means of a plate whirler with a glycol-monomethyl ether solution containing 2% p,p'-bis-(1,8-nitro - naphthalene-sulfonamido)-diphenyl-methane (corresponding to Formula 8) and 0.1% eosine ethyl ester and thoroughly dried, first with hot air, and subsequently, for some minutes, at 100° C. Thereafter, as in Example 4, the layer is exposed to light under a film positive, but for a period of five minutes. Subsequently, it is developed with a 3% solution of trisodium phosphate and rinsed with water. A red positive image is obtained, which, after it has been wiped over with an aqueous solution of acid salts containing monophosphate of ammonia, inked with fatty ink and powdered with asphalt it is deeply etchable with dilute nitric acid to form a cliché.

Having thus described our invention, what we desire to claim is:

1. An article for use in the manufacture of plates for photomechanical reproduction comprising a sheet metal base and a thin uniform light-sensitive layer coated on said base adapted to being converted into imaged and non-imaged areas, said layer including a water insoluble material of the group consisting of peri and ana nitro-naphthalene-sulfonic acids of the group consisting of those sulfonic acids in which the sulfo group is esterified by an aromatic hydroxy compound, those in which the sulfo group is esterified by a heterocyclic hydroxy compound, those sulfonic acids which are amidated and in which the N-atom of the amide group is substituted by a member of the group consisting of aryl, alkyl and heterocyclic compounds.

2. The article of claim 1 wherein the water insoluble layer material has at least one additional nitro group substituted in the naphthalene nucleus.

3. The article of claim 1 wherein the nitro group and the sulfonic group stand in the peri position to each other with respect to the naphthalene nucleus.

4. The article of claim 1 wherein the nitro group and the sulfonic group stand in the ana position to each other with respect to the naphthalene nucleus.

5. The article of claim 1 wherein said layer includes a minor amount of alkali soluble phenol formaldehyde resins to prevent crystallization of the light-sensitive material.

6. An article for use in the manufacture of plates for photomechanical reproduction comprising a sheet metal base and a tin uniform light-sensitive layer coated on said base adapted to being converted into imaged and non-imaged areas, said layer containing p,p'-bis-(1-methyl-5,X-dinitronaphthalene-4-sulfon-amide)-diphenylamine.

7. An article for use in the manufacture of plates for photomechanical reproduction comprising a sheet metal base and a thin uniform light-sensitive layer coated on said base adapted to being converted into imaged and non-imaged areas, said layer containing p,p'-bis-(1,8-nitro-naphthalene-sulfon-amido)-diphenylmethane.

8. An article for use in the manufacture of plates for photomechanical reproduction comprising a sheet metal base and a thin uniform light-sensitive layer coated on said base adapted to being converted into imaged and non-imaged areas, said layer containing p,p'-bis-(1-methyl - 5 - nitro-naphthalene - 4-sulfonic acid)-diphenyl ester.

9. An article for use in the manufacture of plates for photomechanical reproduction comprising a sheet metal base and a thin uniform light-sensitive layer coated on said base adapted to being converted into imaged and non-imaged areas, said layer containing p,p'-bis-(1-methyl - 5,X - dinitro-naphthalene - 4 - sulfonamido)-2,2'-diphenylsulfide.

10. An article for use in the manufacture of plates for photomechanical reproduction comprising a sheet metal base and a thin uniform light-sensitive layer coated on said base adapted to be converted into imaged and non-imaged areas, said layer containing p,p'-bis-(1-methyl- 5,X - dinitro - naphthalene - 4 - sulfonamido) - 2,2' - dimethoxy-diphenyl-sulfone.

11. A lithographic printing plate comprising a sheet metal base and a light sensitive layer coated on said base, said layer consisting of imaged areas and alkali soluble non-imaged areas, said non-imaged areas being free from and said imaged areas containing p,p'-bis-(1-methyl-5,X-dinitro-naphthalene-4-sulfonamide)-diphenylamine.

12. A lithographic printing plate comprising a sheet-metal base and a light sensitive layer coated on said base, said layer consisting of imaged areas and alkali soluble non-imaged areas, said non-imaged areas being free from and said imaged areas containing p,p'-bis-(1,8-nitro-naphthalene-sulfon-amido)-diphenylmethane.

13. A lithographic printing plate comprising a sheet-metal base and a light sensitive layer coated on said base, said layer consisting of imaged areas and alkali soluble non-imaged areas, said non-imaged areas being free from and said imaged areas containing p,p'-bis-(1-methyl-5-nitro-naphthalene-4-sulfonic acid)-diphenyl ester.

14. A lithographic printing plate comprising a sheet-metal base and a light sensitive layer coated on said base, said layer consisting of imaged areas and alkali soluble non-imaged areas, said non-imaged areas being free from and said imaged areas containing p,p'-bis-(1-methyl-5,X - dinitro - naphthalene - 4 - sulfonamido)-2,2'-dimethcxydiphenylsulfide.

15. A lithographic printing plate comprising a sheet-metal base and a light sensitive layer coated on said base, said layer consisting of imaged areas and alkali soluble non-imaged areas, said non-imaged areas being free from and said imaged areas containing p,p'-bis-(1-methyl-5,X-dinitro - naphthalene - 4 - sulfonamido) - 2,2'-dimethoxy-diphenyl-sulfone.

16. The positive working process for forming plates for use in photomechanical reproduction comprising the steps of coating a base with a light sensitive layer including a water insoluble material of the group consisting of peri and ana nitronaphthalene-sulfonic acids of the group consisting of those sulfonic acids in which the sulfo group is esterified by an aromatic hydroxy compound, those in which the sulfo group is esterified by a heterocyclic hydroxy compound, those sulfonic acids which are amidated and in which the N-atom of the amide group is substituted by a member of the group consisting of aryl, alkyl and heterocyclic compounds exposing said light-sensitive layer to light under a pattern to decompose said nitro-naphthalene compound in the light struck areas and treating the exposed layer with a dilute alkaline solution to remove the decomposed nitro-naphthalene compound.

17. The process of claim 16 wherein the developed plate is treated with a dilute acid and then inked with greasy ink.

18. The process of claim 16 wherein the developed plate is treated with dilute phosphoric acid and then inked with greasy ink.

19. The process of claim 17 wherein the exposed plate is inked with greasy ink prior to being developed with alkali.

References Cited in the file of this patent

UNITED STATES PATENTS

| | | |
|---|---|---|
| 2,179,239 | Wilmanns et al. | Nov. 7, 1939 |

FOREIGN PATENTS

| | | |
|---|---|---|
| 145,850 | Austria | May 25, 1936 |
| 904,255 | France | Feb. 19, 1945 |
| 470,026 | Canada | Dec. 12, 1950 |

OTHER REFERENCES

Helvetica Chimica Acta, vol. XIII, page 184 (1930), and vol. XVII, pages 1147 and 1151 (1934). Copy in Div. 67.